United States Patent
Baer et al.

(10) Patent No.: US 6,800,958 B1
(45) Date of Patent: Oct. 5, 2004

(54) WIRELESS DATA AND ENERGY TRANSMISSION DEVICE

(75) Inventors: Lothar Baer, Essen (DE); Andreas Heinrich, Heiligenhaus (DE); Klaus Kulik, Velbert (DE); Andreas Rüffer, Heiligenhaus (DE)

(73) Assignee: Kiekert AG, Heiligenhaus (DE)

( * ) Notice: Subject to any disclaimer, the term of this patent is extended or adjusted under 35 U.S.C. 154(b) by 268 days.

(21) Appl. No.: 10/089,775
(22) PCT Filed: Sep. 29, 2000
(86) PCT No.: PCT/EP00/09552
§ 371 (c)(1),
(2), (4) Date: May 31, 2002
(87) PCT Pub. No.: WO01/25056
PCT Pub. Date: Apr. 12, 2001

(30) Foreign Application Priority Data

Oct. 1, 1999  (DE) .......................................... 199 47 491
May 16, 2000  (DE) .......................................... 100 23 663

(51) Int. Cl.⁷ ................................................. B60L 1/00
(52) U.S. Cl. ..................................................... 307/10.1
(58) Field of Search ............................... 307/9.1, 10.1, 307/10.2; 375/258

(56) References Cited

U.S. PATENT DOCUMENTS

| | | | | | |
|---|---|---|---|---|---|
| 5,804,887 | A | * | 9/1998 | Holzapfel et al. | 307/10.1 |
| 5,821,632 | A | * | 10/1998 | Normann et al. | 307/10.1 |
| 6,091,779 | A | * | 7/2000 | Griessbach | 375/258 |
| 6,400,255 | B1 | * | 6/2002 | Ohnishi et al. | 340/5.62 |
| 6,459,175 | B1 | * | 10/2002 | Potega | 307/149 |
| 6,476,515 | B1 | * | 11/2002 | Yamamoto et al. | 307/10.1 |
| 6,501,387 | B2 | * | 12/2002 | Skiver et al. | 340/815.4 |
| 6,584,389 | B1 | * | 6/2003 | Reimann et al. | 701/49 |

FOREIGN PATENT DOCUMENTS

| | | |
|---|---|---|
| DE | 197 02 698 | 10/1987 |
| DE | 198 12 855 | 10/1996 |
| DE | 195 38 528 | 4/1997 |
| DE | 196 02 316 | 6/1997 |
| DE | 197 17 490 | 10/1998 |
| DE | 198 14 670 | 10/1998 |
| DE | 197 43 313 | 12/1998 |
| EP | 0 616 924 | 9/1994 |
| EP | 0 640 734 | 3/1995 |
| JP | 7-267020 | 10/1995 |

* cited by examiner

Primary Examiner—Adolf Berhane
(74) Attorney, Agent, or Firm—Herbert Dubno; Andrew Wilford

(57) ABSTRACT

The invention relates to a device for the wireless transmission of data and energy between an element to be mounted on or in a vehicle body, especially a vehicle sliding door (2), a vehicle seat or a comparable additional unit, and a vehicle body (1). The basic design of the inventive device comprises an electric power source (18), control electronics (17, 17') mounted in the vehicle body and at least one pertaining coil (20) also mounted in the vehicle body. The device further comprises control electronics (11) mounted in the element and at least one pertaining coil (19) also mounted in the element. Both coils (19, 20) are inductively coupled via a common transmitting/receiving path to transmit data and energy. According to the invention, the coil (19) mounted in the element is enclosed by the coil (20) mounted in the vehicle body and can be displaced in a longitudinal direction within the coil (20) mounted in the vehicle body or vice versa.

7 Claims, 6 Drawing Sheets

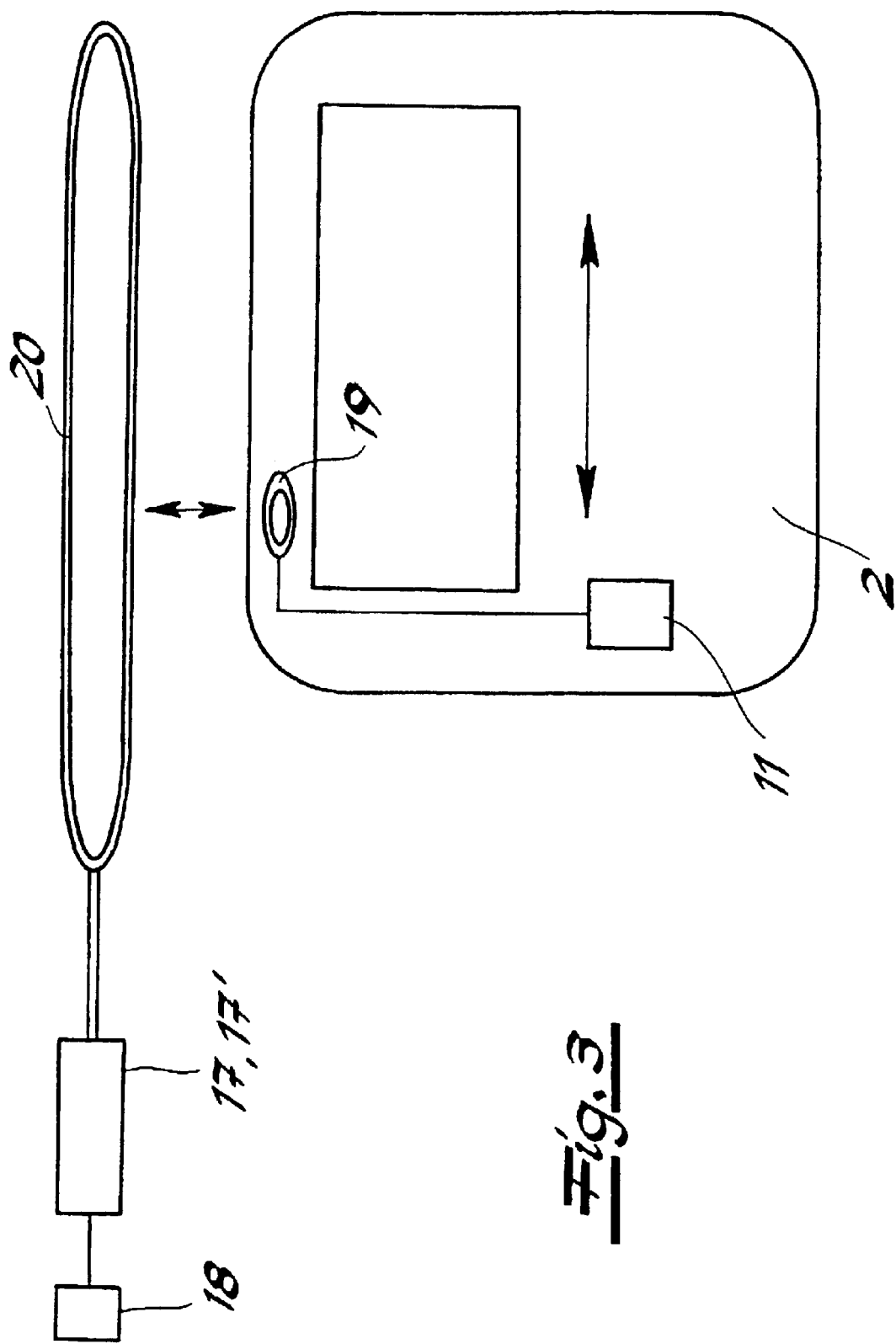

WIRELESS DATA AND ENERGY TRANSMISSION DEVICE

The invention relates to an apparatus for the wireless transmission of data and energy between a part, for instance a motor-vehicle sliding door, a passenger seat, or a similar part, and a motor-vehicle body having an electrical power supply, and a body-mounted electronic controller having a body-mounted coil, and a part-mounted electronic controller having at least one respective part-mounted coil, both coils being inductively coupled to transmit data as well as energy over a common send/receive path.

Such an apparatus is described in EP 0,616,924. Here there is a transformer that moves energy in one direction and data in both directions. Switches on both sides of the transformer serve to monitor how the transfer is going as well as to evaluate and control it. In particular the transformer has a primary and a secondary winding with one of the windings being fixed while the other winding can move relative to it. The stationary winding is fixed adjacent the steering column of a motor vehicle while the movable coil is connected with the motor-vehicle steering wheel.

In addition parts such as a sliding door built into or onto a motor-vehicle body are know basically from German 197 17 490. Here an electrical supply cable is wound up on a drum with a rewinder. The one end of the supply cable is fixed at the core of the drum of the body-mounted cable drum and the other end is connected to the sliding door. Such connection devices are effective but have a limited service life and thus wear out so they must periodically be serviced.

In contrast to the standard personal-use motor vehicles, larger vehicles such as so-called minivans or full-size vans or sport-utility vehicles have in recent years taken up more of the market. Such vehicles are usually provided with at least one motor-vehicle sliding door or doors that are usually arranged on the passenger side behind the passenger-side front door. In order to park in ever smaller spaces such use of sliding doors is likely to be found even in other vehicles. Sliding doors can be opened in relatively cramped surroundings and make it easier to get in or out or load or unload through the substantially wide open space left by the open sliding door, but are quite a bit more expensive compared to the standard hinge-mounted swinging door.

Like swinging doors, sliding doors are often provided with various electrical devices as for example an active door-blocked detecting device, a door latch with electrical opening or power assist, as well as central locking systems and security devices with diagnosable two-way communications, an electrical window opener as well as monitoring devices, e.g. for the window opener and the door latch. In addition it is necessary to transmit electrical energy to power the various devices and control data to the electronic controllers in the (sliding) door, which is more expensive to do in a sliding door due to the nonfixed contact than in a swinging door.

It is also known from German 197 06 393 to transmit data in a motor vehicle between a body-mounted electronic controller and a door-mounted electronic controller in a wireless manner via a transmitter and a receiver communicating via HF or by sound or infrared light.

In this system the energy supply for the electronic controllers in the sliding door when it is open is constituted by a battery that if necessary can also be fed by a solar panel. When the door is closed the energy supply for the door-mounted electronic controller is taken over by the vehicle-mounted battery via a contact system, preferably a multiple-pole plug and socket.

Japanese patent 07-267,020 describes how the electrical supply for devices in the sliding door take place over a plug/socket system, the plug and socket being in contact with each other when the door is closed to transmit electrical energy to the devices.

The system of German 198 14 670 has a motor-vehicle sliding door provided with a battery for its electronic controller that is connected by a plug/socket arrangement when the door is closed for charging purposes.

Finally German 196 02 316 describes an apparatus for transmitting data or energy. It has an antenna tuned circuit that is made to oscillate by a trigger signal. The oscillations are transferred to a transponder tuned circuit.

Such data and energy transmission and supply systems for electronic controllers are generally acceptable. There is however the problem that a plug/socket system exposes the contacts to the air when the door is opened so they can corrode or so that can actually meet physical harm. In this manner the connection for transmitting the small (signal) currents (of about 10 mA and less) for example can lead to problems because of the high resistance.

The use of a separate battery in the (sliding) door to supply current to the electronic controller requires regular maintenance to ensure that the energy supply continues to function. The invention proposes hereto a solution.

It is a technical object of the invention, to so improve such an apparatus that overall one gets a cost-effective, robust, and generally applicable transmission of energy and data.

This object is attained according to the invention by an apparatus of this type wherein the part-mounted coil is surrounded by the body-mounted coil and is longitudinally slidable inside the body-mounted coil or vice versa. In other words, the invention of course encompasses the reverse system whereby the body-mounted coil is surrounded the part-mounted coil and is longitudinally slidable inside the part-mounted coil.

Preferably the body-mounted coil and the part-mounted coil extend generally parallel to each other for inductive coupling or have overlapping portions. It is only necessary that the inductive coupling be maintained with the produced electromagnetic fields overlap.

Thus the body-mounted coil is connected both to the electrical power supply as well as to the electronic controller. The part-mounted coil on the other hand is connected with the respective electronic controller as well as with a load.

In this manner the above-detailed contact problem is cured because wire-connected data and/or energy transmission is done away with. In addition the problems of the known roll-up mechanism (see German 197 17 490) are no longer to be feared because there is none. The same is true for a prior-art battery in the sliding door since so that the installation and maintenance costs for it are spared. Even safety is improved because the charge state of this battery does not need to be monitored. In accordance with the invention the send/receive path can also be used only for transmitting data or energy for the part or sliding-door electronics.

Contrary to the teachings of EP 0,640,734 there is wireless transmission of energy and data between individual body parts and not between a key and the door latch. The same is true with reference to German 196 02 316.

It should be emphasized that the described body and part according to the invention could also be a seat or similar part such as a child seat. In a passenger seat the described system insures that person-specific data is transmitted without wires from the body-mounted electronic controller. This person-specific data is generally provided when a dialog between a (HF remote) key and a body-mounted electronic controller is established. This is generally initiated by a user inserting the right key peg in an ignition switch on the dashboard after positively interrogating and identifying the key type.

In this manner all user- or person-specific data can be transmitted by the key to the body-mounted electronic controller which at its end handles the appropriate loads or parts built onto or into the vehicle. This could include for example the desired outside mirror setting, the positioning of the seat and seat back, and if necessary the illumination and dashboard lighting. To this end the data and/or energy supply are set up as described above.

Thus the invention makes it possible to supply built on systems, for example a removable child seat with data and/or energy. It is possible to identify such a child seat when installed in a passenger seat and turn off the respective air bag so that in case it operates a child in the child seat is not injured. It is also possible to create a data and/or energy exchange between the body-mounted electronic controller and the add-on part, here the child seat. It is possible simply to determine if a (removable) seat or child seat is present.

It is further within the scope of the invention to establish such a send/receive path between a nonremovable body-mounted base part of a vehicle radio and a removable part of the radio. In this manner the universal character of the described system for data and/or energy transmission is clear.

This also makes an example clear whereby in a mobile home serving as body a satellite key is supplied in the described manner with data and/or energy. Typical uses are still to be seen so that doors, in particular sliding doors, can in this manner be supplied with energy and/or data.

Further features important to the invention are described in the following. Thus the invention suggests that the body-mounted coil is an air or ferrite coil with an elongated rectangular section and an enclosed longitudinal space for the part-mounted coil slidable therein. Normally this body-mounted coil is mounted in already provided guide rail for the sliding door or is mounted immediately adjacent this guide rail.

Here it is important that the body-mounted coil be insulated from the normally metallic body. It is further recommended that the part-mounted coil be arranged in or on a guide slide for guiding the sliding door in the guide rail. This uses already provided elements of a sliding door, namely a guide rail on one side and on the other side the guide slide. They must only be modified to comply with the invention by being provided with the claimed coils. As a result this is a particularly robust and compact system because on the one hand the guide rail and on the other hand the guide slide can be used to hold and/or protect the respective coils.

In order to insure a particularly good inductive coupling between the body-mounted coil and the part-mounted coil, it is further suggested that the part-mounted coil has a cross-sectional size corresponding to a width of the longitudinal space. It can form a transponder together with the electronic unit or microprocessor connected to it. In this case the preferred coils and electronic circuits form the transponder by means of which there is a preferably bidirectional exchange of data and/or energy.

The transmission of data and/or energy takes place as follows. To supply energy to the sliding-door electronic controller and load the body-mounted coil or the coil element operates as a transmitting antenna and transfers to the part-mounted coil as a receiver a voltage (preferably with a frequency of 125 kHz or 13.56 MHz). Thus the energy transmission is carried out in pulses in order to minimize the current load of the entire apparatus. In other words periodic signals with a period of preferably 150 ms and a duration of about 5 ms are sent in order to supply energy to the part-mounted electronic controller or its load.

In order to facilitate data transfer at the same and/or another time the above-described pulsating voltage or its signal are modulated. In other words the alternating-current portion is modified with a low-frequency information signal which is received in the part-mounted electronic controller or its receiver, is filtered, and then demodulated. In any case the overlain low-frequency information signal can be filtered out and processed in a microprocessor in order to convert the various signals into the appropriate actions. This is known per se.

It is also possible in the scope of the invention to work with a frequency of from 13 to 13.56 MHz. This always insure that all possible information can be transmitted from the body to the sliding door or vice versa. Thus for example the following devices built into a sliding door can be queried: locking-pawl switch, fork switch, central-lock switch, antitheft-protection switch, child-safety switch, door-blockage switch, position detector for the window lifter, and so on.

Of course in addition to the wireless energy transmission it is possible to use a hard-wired energy transmission that is particularly useful in the case that the sliding door is closed. In this case the described devices can be connected conventionally, that is via contacts, with the necessary energy sources on the motor-vehicle body. It is therefore possible to supply only the electronic controller with energy, while the other devices can be fed with current by a hard-wired connection.

This always insures that the electronic controller and devices mounted on the sliding door (for example a central locking device and/or a window drive) are supplied with data and energy regardless of the actual position of the sliding door. In other words according to the invention the same status and functioning is achieved as by a pivotal door or hatch that is supplied conventionally by a hard-wired connection with the necessary data and/or energy. This constitutes a major advantage.

The invention is described more closely in the following with reference to a drawing showing one embodiment. Therein:

FIG. 3 shows the main elements of the invention;

Figure 4A:
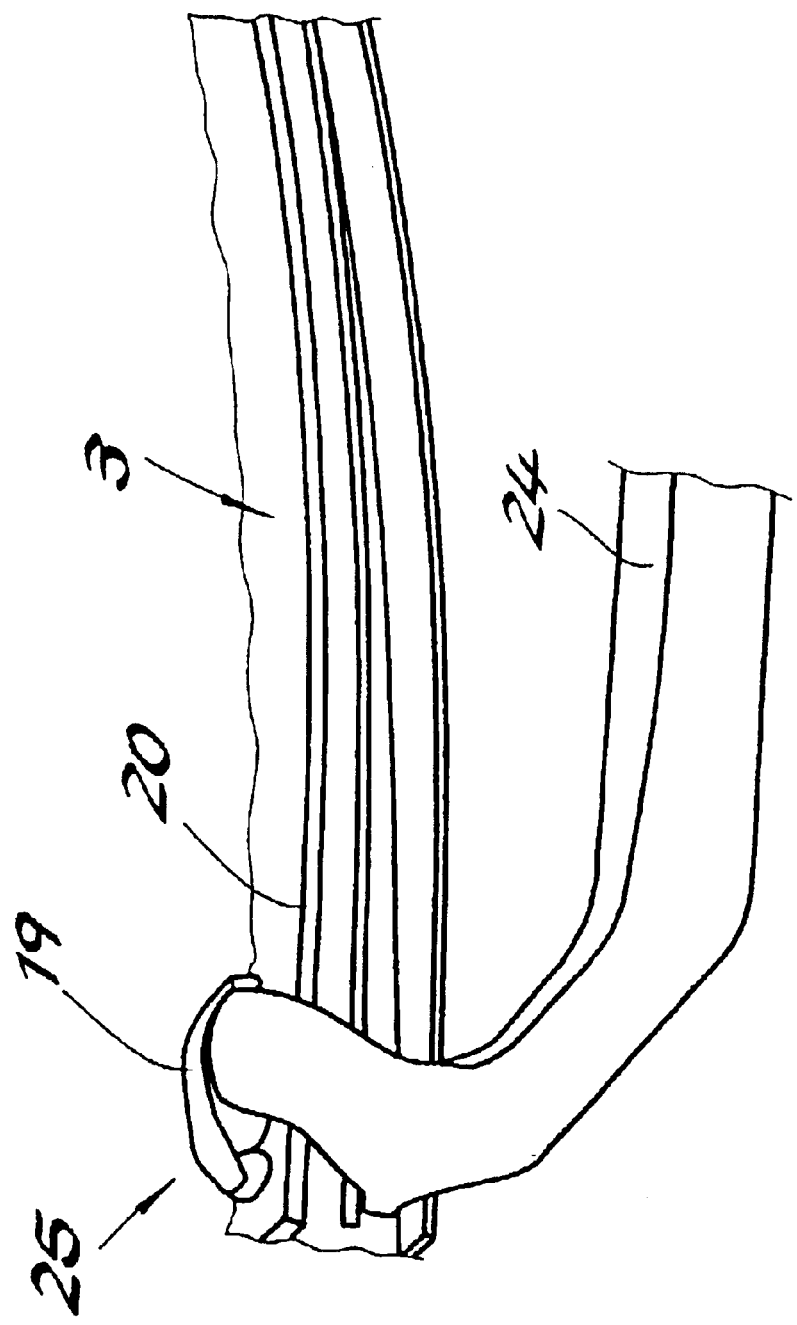
Figure 4C:
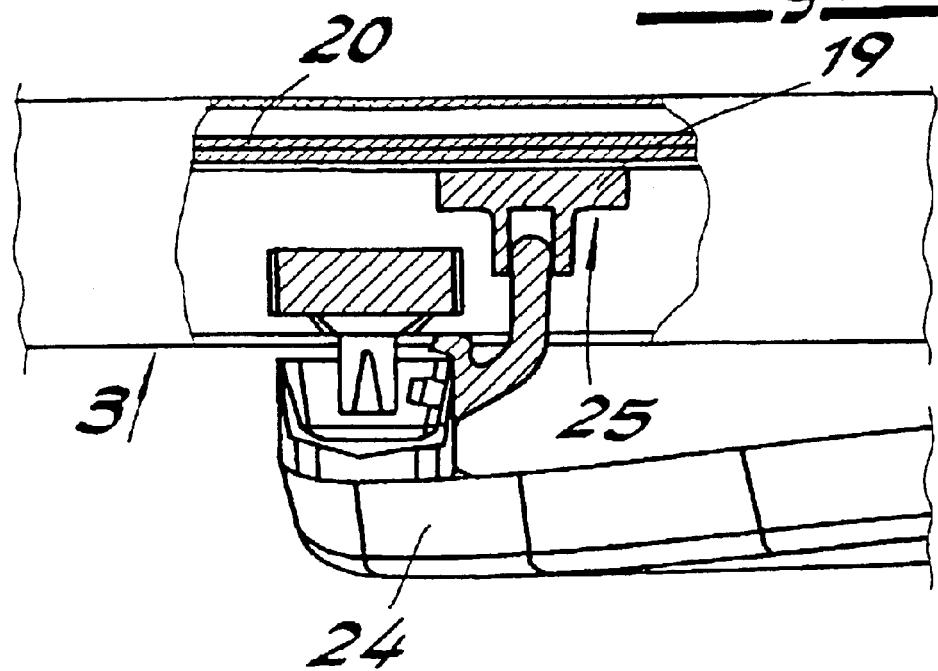
Figure 4B:
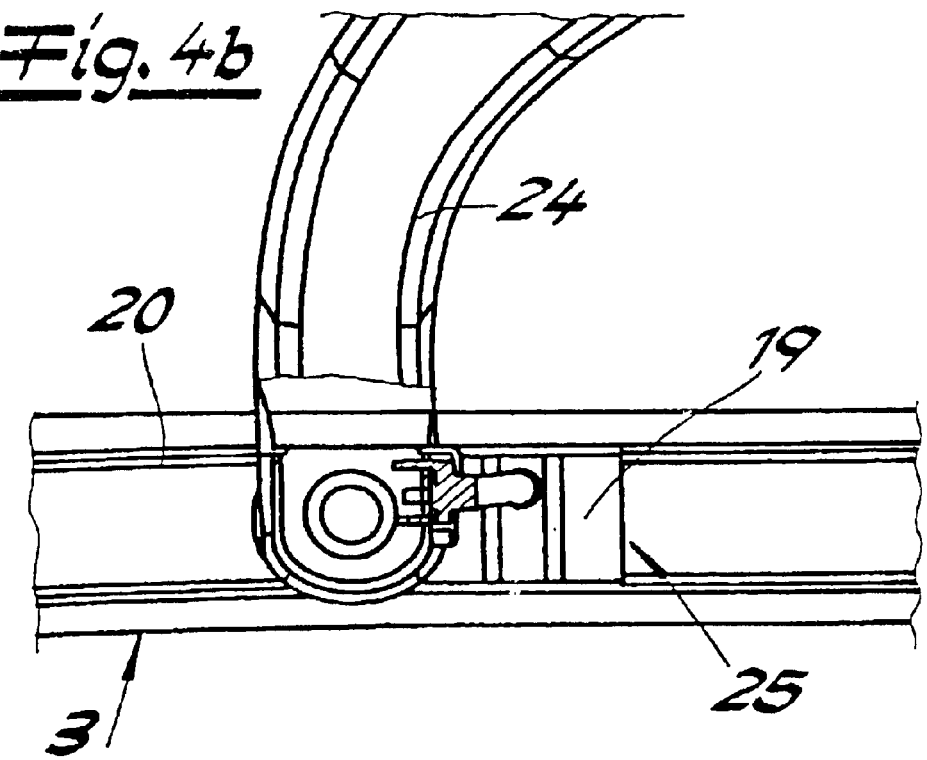
Figure 5:
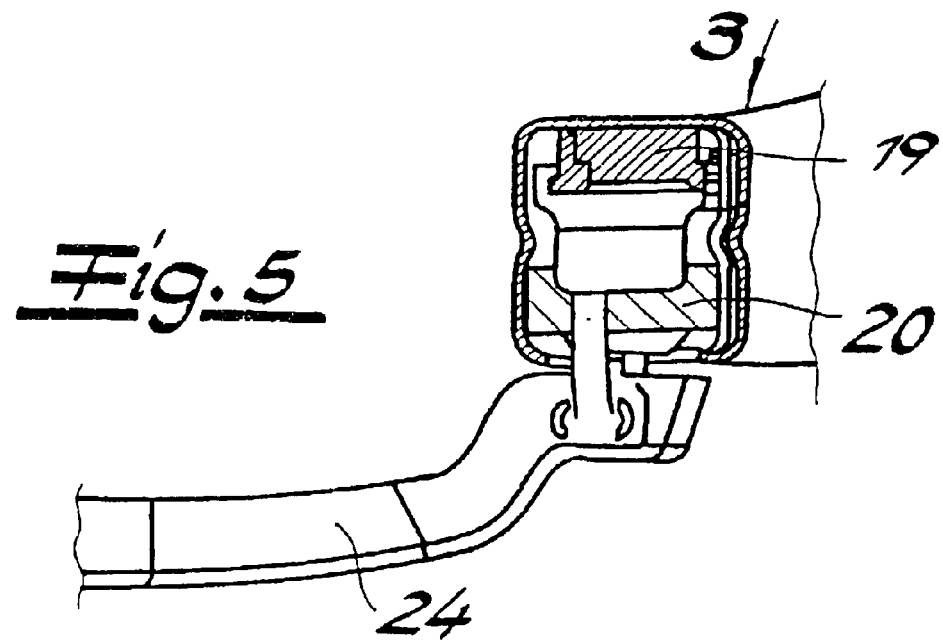
Figure 6:
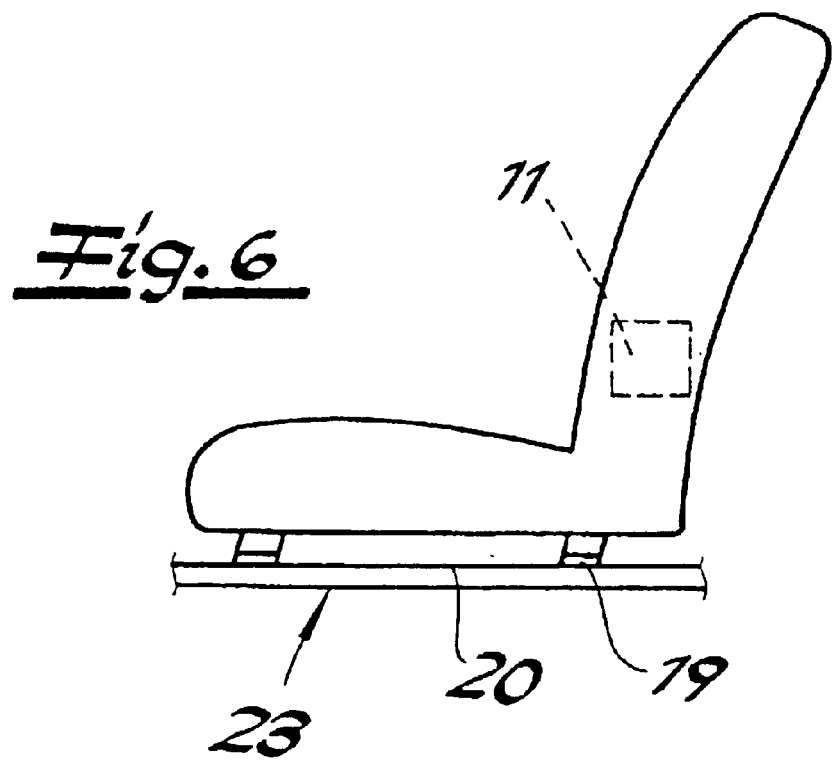

FIGS. 4a, 4b, and 4c show a first embodiment of the data/energy transmission system with a guide rail of a sliding door in perspective view (see FIG. 4a), in schematic top view (see FIG. 4b), and in section (see FIG. 4c);

FIG. 5 is a variant on the structure of FIG. 4; and;

FIG. 6 is a variant in a motor-vehicle seat.

Figure 1:
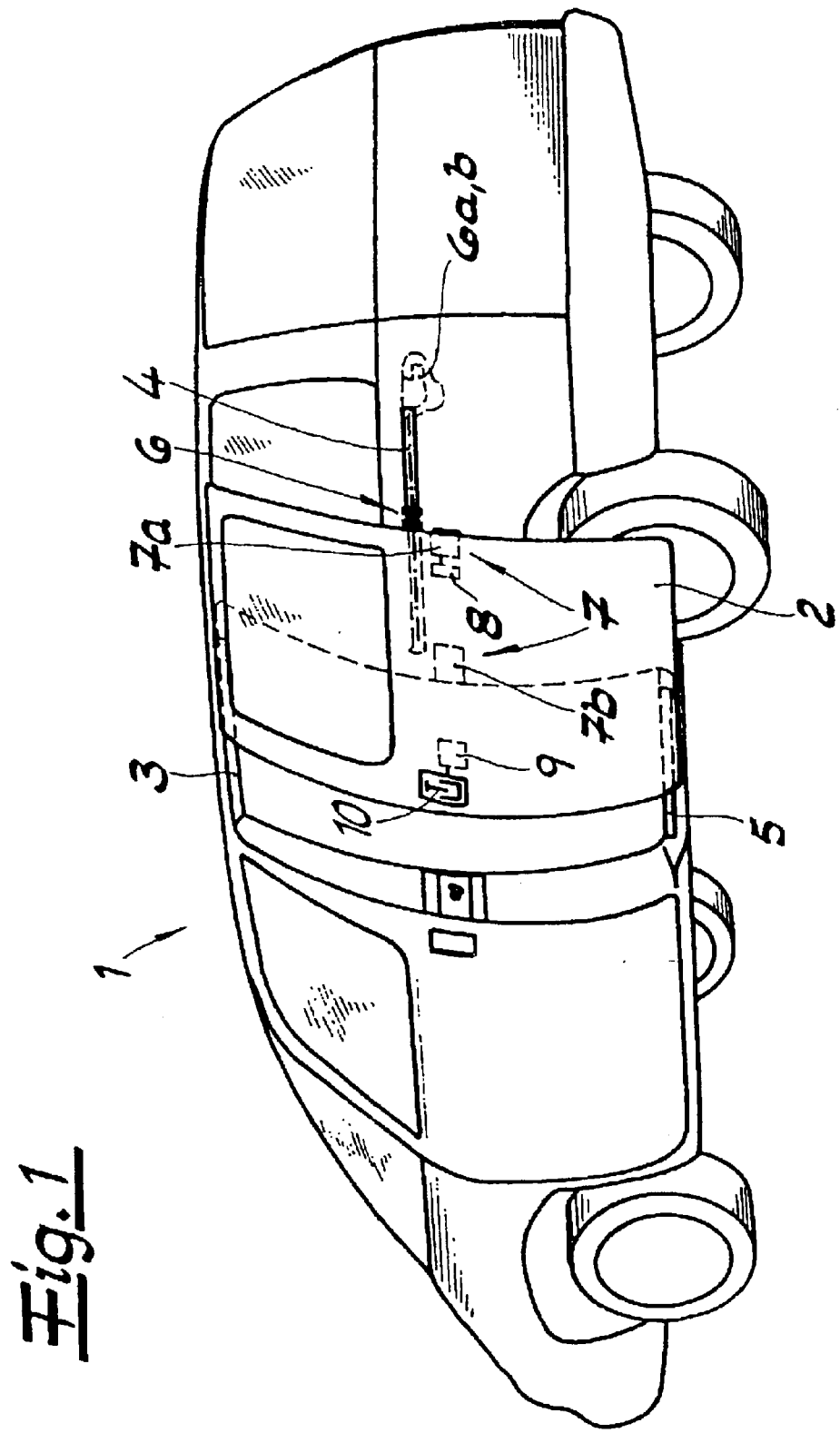
FIG. 1 is a motor vehicle with a partially opened sliding door.
Figure 2:
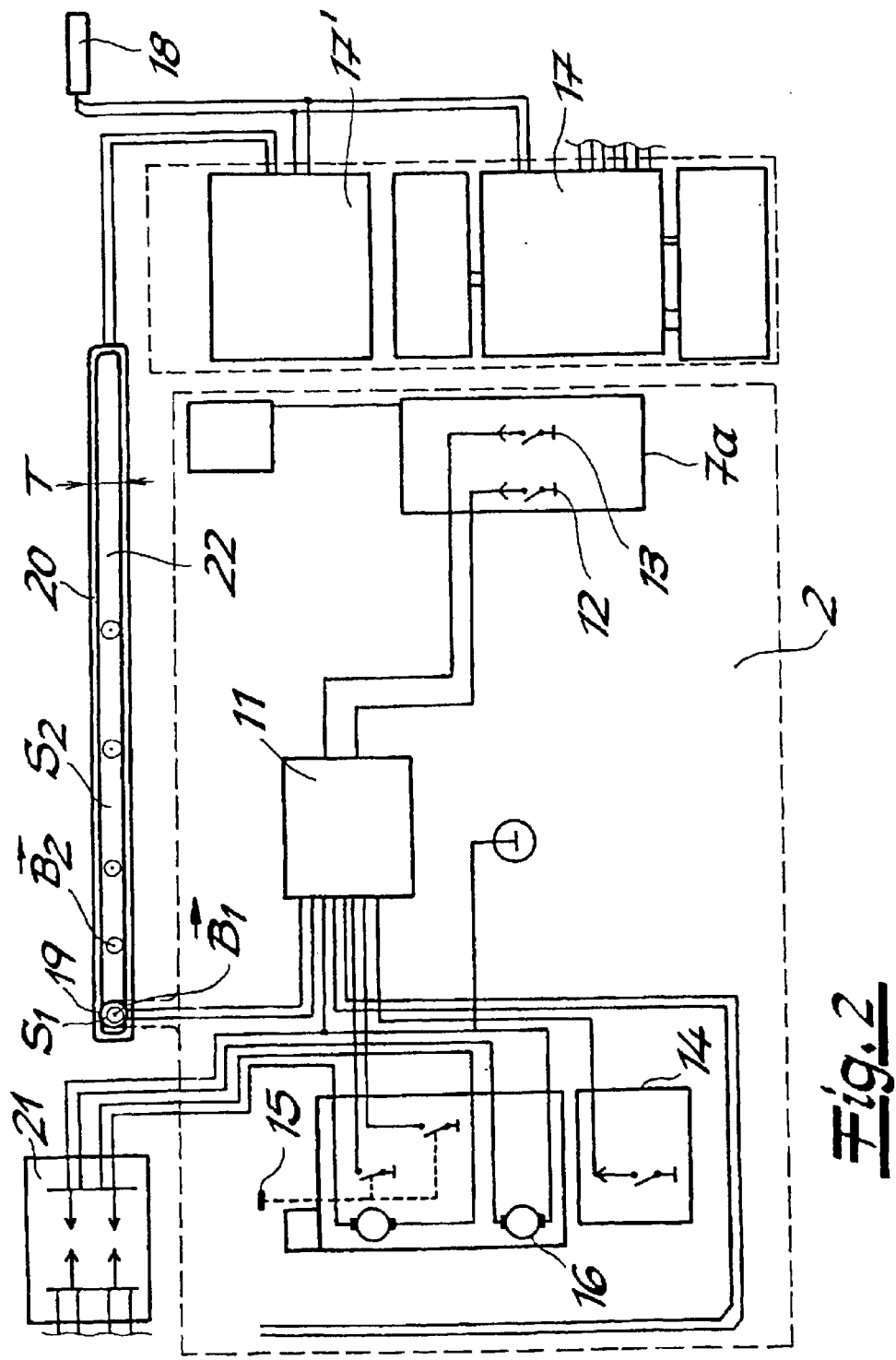
FIG. 2 is a schematic representation of the main parts according to FIG. 1 with the door closed.

FIG. 1 shows a motor vehicle 1 with a side-mounted door 2. This motor-vehicle door 2 is a movable cover and body part forming part of the motor-vehicle body, here a motor-vehicle sliding door 2. This motor-vehicle sliding door 2 is guided in guide rails 3, 4, and 5. Unillustrated rollers or a guide slide are employed. FIG. 1 shows the motor-vehicle sliding door 2 in a partially open position while FIG. 2 shows the closed position. When the motor-vehicle sliding door 2 is shifted into the closed position it moves out of the slide plane.

Movement of the motor-vehicle sliding door 2 can be effected manually or by electric power. To this end there is a drive 6 which in this embodiment has a toothed belt and a coupling arrangement for closing and opening as described in detail in German patent application 197 02 698.

The drive 6 has a sliding-door actuator 6a which can be mechanically controlled. In addition FIG. 1 shows a coupling 6b for the above-mentioned toothed belt. In this embodiment the sliding-door actuator 6a is electronically controlled. In addition FIG. 1 shows at least one motor-vehicle door latch 7 in the body. This motor-vehicle door latch 7 has a latch part 7a on the motor-vehicle door 2 or sliding door 2 and a keeper 7b on the body. The motor-vehicle door latch 7 is also responsible for the above-mentioned shifting in (when closing) and shifting out (when opening) of the motor-vehicle sliding door 2.

To this end the latch keeper 7b according to this embodiment is a servo keeper 7b. FIG. 1 further shows an actuating mechanism B with antitheft protection as well as a control latch 9 which is mechanically coupled with an outside door handle 10 (see the dot-dash "mechanical" connection in FIG. 1). Furthermore there is a mechanical connection between the outside door handle 10 (or the inside handle), the latch 9, the actuating mechanism 8 with antitheft protection, the latch 7a of the motor-vehicle door latch 7 (see the mechanical connection from the control latch 9 to the latch 7a in FIG. 1). A child-safety switch and an also unillustrated central locking system are connected to the control latch 9. Further particulars are described in above cited German 197 06 393.

In the motor-vehicle sliding door 2 there is in addition a door-mounted controller 11 or electronic controller 11 which is connected with the latch 7a. The electronic controller 11 receives signals from a latch-pawl switch 12 as well as from a fork switch 13. In addition an outside door-actuating device 14 has an active antipinch protector constituted as a peripheral electrically conducting plastic profile whose resistance changes with pressure. The electronic controller 11 operates an inside actuating device 15 as well as if necessary a latching pawl 16. Finally according to the signals from the devices 12, 13, and 14 the motor-vehicle door 2 can be closed electrically (or also mechanically) by actuating an inside or outside handle (see FIG. 2).

The body carries an electronic controller 17 as well as a receiver 17' which are together mounted in the C-column of the motor vehicle 1. In addition there is an electrical power supply 18 in the motor vehicle 1. Wireless data and/or energy transfer between the motor vehicle 1 or its body and built-on parts 2 or the motor-vehicle sliding door 2 is via two coils 19 and 20 which send and receive inductively. The door-mounted coil 19 with the controller 11 and, if necessary, any loads such as the latch pawl 16 or the inside actuating mechanism 15 are thus connected to the power supply. Data evaluation and transmission are handled by the electronic controller 11 in the manner described above.

In this embodiment a supplemental energy supply for the loads 15 and 16 or 11 can take place via contact pins 21 when the motor-vehicle sliding door 2 is closed. This is however not essential because according to the invention the energy transfer can always be done via the coils 19 and 20. The same is true for data transfer which is normally bidirectional.

The body-mounted coil 20 is connected via the receiver 17' with the electrical supply 18 and thus to the controller 17. In this embodiment both coils 19 and 20 have overlapping portions $S_1$ and $S_2$ that fit together or extend parallel to each other as shown in FIG. 3 in order to effect the necessary transformer-type inductive coupling. This ensures that the existing and queried magnetic fields or the respective magnetic inductions $\rightarrow B_1$ and $\rightarrow B_2$ and the respective coil portions $S_1$ and $S_2$ or overlaps are generally parallel to each other (see the illustrated magnetic field lines in FIG. 2).

In order to ensure the wireless data and/or energy transfer even when the motor-vehicle sliding door 2 is moving, the body-mounted coil 20 is integrated in the guide rail—in this embodiment the upper guide rail 3—of the motor vehicle 1. The body-mounted coil 20 extends mainly horizontally but can also be vertical or at any desired angle to the movement plane.

The body-mounted coil 20 is an air coil of lacquered copper wire with a coil body holding it in or on the body. This coil or air coil 20 has an elongated rectangular shape $S_2$ whose longest side generally corresponds to the length of the door opening. The coil 20 encloses a longitudinal space 22 of generally oval shape which has a width T of between 20 and 50 mm, preferably about 18 mm.

The device/part/sliding-door coil 19 is longitudinally slidable in this longitudinal gap 22. This coil is also for example an air coil with copper wire on a coil core (preferably of plastic). This coil 19 has a shape $S_1$ corresponding to the width T of the longitudinal space 22. It can be a circular coil with a length between 20 and 60 mm, preferably 40 mm. Round as well as rectangular shapes $S_1$ with rounded corners are possible. The diameter preferably corresponds to the width T and is about 10 to 50 mm, preferably 10 to 30 mm. Most preferably the diameter is about 18 mm.

In any case the fit of the portion S1 of the coil 19 in the gap 22 of width T makes for an optimal guiding and bidirectional coupling of the door-mounted coil 19 with the body-mounted coil 20 via their electrical field.

FIG. 3 shows the important parts of the invention in simplified form. FIG. 6 shows a car seat corresponding to FIG. 3. Here the body-mounted coil 20 is mounted in a floor rail 23 and is inductively coupled to the part-mounted coil 19. This coil 19 is mounted in unillustrated rollers by means of which the passenger seat is longitudinally slidable in the floor rail 23. In addition the part-mounted controller 11 is shown inside the passenger seat. Here the coupling and shapes of the coils 19 and 20 can be like what is shown in below-detailed FIGS. 4 and 5.

FIG. 4a shows a guide rail 3 on the motor-vehicle sliding door 2 which simultaneously serves as a coil support and preferably is made of plastic. This guide rail 3 extends generally in the motor-vehicle travel direction in the outer skin of the vehicle body as shown clearly in FIG. 1. The part- or door-mounted coil is mounted at an end of an outrigger 24 carrying the unillustrated motor-vehicle sliding door. This coil 19 slides as shown in FIGS. 4b and 4c along the body-mounted coil 20, that is both coils 19 and extend generally parallel to each other.

As a result of the very close juxtaposition to each other, the desired inductive coupling is achieved which makes possible the described data and/or energy transfer. In the embodiment according to FIG. 4 the coil 19 is imbedded in a slide shoe 25 made for example of plastic and which moves along the guide rail 3 of metal or plastic and that serves as a guide slide.

The guide rail 3 carries the coil 20 that in the variant of FIG. 5 is embedded in the guide rail 3. According to this variant the coil 19 and the coil 20 are spaced from each other which is not a problem as long as their electromagnetic fields overlap, that is the coils 19 and 20 can induce fields of sufficient strength in each other.

What is claimed is:

1. An apparatus for the wireless transmission of data and energy between a part, for instance a motor-vehicle sliding door, a passenger seat, or a similar part, and a motor-vehicle body having
- an electrical power supply, and
- a body-mounted electronic controller having a body-mounted coil, and
- a part-mounted electronic controller having at least one respective part-mounted coil, both coils being inductively coupled to transmit data as well as energy over a common send/receive path, wherein
- the part-mounted coil is surrounded by the body-mounted coil and is longitudinally slidable inside the body-mounted coil or vice versa.

2. The apparatus according to claim 1 wherein the body-mounted coil and the part-mounted coil extend generally parallel to each other or have overlapping portions.

3. The apparatus according to claim 1 wherein the body-mounted coil is an air or ferrite coil with an elongated rectangular section and an enclosed longitudinal space for the part-mounted coil slidable therein, or vice versa.

4. The apparatus according to claim 3 wherein the part-mounted coil has a cross-sectional size corresponding to a width of the longitudinal space.

5. The apparatus according to claim 1 wherein the part-mounted coil together with the electronic unit connected to it form a transponder.

6. The apparatus according to claim 1 wherein the body-mounted coil is built into a guide rail, preferably an upper guide rail for the sliding door, and the part-mounted coil is mounted on a guide slide for guiding the motor-vehicle sliding door in the guide rail.

7. The apparatus according to claim 1 wherein bidirectional data transfer takes place.

* * * * *